Patented Apr. 11, 1944

2,346,492

UNITED STATES PATENT OFFICE 2,346,492

MANUFACTURE OF PRIMARY AMINO-SUBSTITUTED AROMATIC AMIDES

Arthur Howard Knight and William Elliot Stephen, Blackley, Manchester, England, assignors to Imperial Chemical Industries Limited, a corporation of Great Britain No Drawing. Application September 17, 1942, Serial No. 458,731. In Great Britain October 8, 1941

6 Claims. (Cl. 260—562)

The present invention relates to the manufacture of new primary amines of the benzene series which are valuable as dyestuff intermediates.

According to the invention we make primary amines of the benzene series of general formula $$X.CO.NY.R.NH_2$$

where X is a monochloro- or monobromo-alkyl group containing not more than three carbon atoms, Y is an alkyl group containing not more than six carbon atoms, R is a phenylene group which may carry simple azo dyestuff substituents, for example, methyl, and the primary amino group is in meta or para position to the X.CO.NY. group, by reducing the corresponding nitro compounds in an inert water-miscible organic solvent either by means of iron and acid (for example hydrochloric acid, or of tin and hydrochloric acid.

As the result of a large number of experiments, we have found that nitro compounds of the above general formula are very difficult to reduce without replacement by hydrogen of the chlorine or bromine atom of the grouping X.CO. or without side reactions leading to gummy and valueless products. Attempts at reduction by such well known agents as sodium sulphide, sodium disulphide, and sodium hydrogen sulphide gave unsatisfactory results, as valueless gummy products were obtained. Attempts at reduction by means of zinc and hydrochloric acid in for example aqueous ethyl alcohol (50%) even at ordinary temperatures (15°–20° C.) lead to very extensive elimination of halogen.

We have found, however, that if the reduction is carried out by the process of this invention, the amines are obtained in good yield.

As examples of nitro compounds which may be used as starting materials in the present invention, we mention: 4-nitro-2-N-ethyl-omega-chloroacet-toluidide, 4-nitro-1-N-ethyl-omega-chloroacetanilide, 4-nitro-2-N-ethyl-α-bromobutyryltoluidine, 4-nitro-1-N-isopropyl-omega-chloroacetanilide, 4-nitro-1-N-n-butyl-omega-chloroacetanilide, 4-nitro-2-N-ethyl-omega-chloroacettoluidide, 4-nitro-1-N-ethyl-omega-chloroacet-toluidide, 4-nitro-1-N-ethyl-omega-chloropropionanilide, 4-nitro-2-N-ethyl-omega-chloropropiontoluidide, 4-nitro-2-N-ethyl-omega-bromopropiontoluidide and 4-nitro-1-N-ethyl-omega-bromopropionanilide.

The nitro compounds which are used as starting materials can be obtained by reacting the corresponding nitro-secondary amines of the general formula $HNY.R.NO_2$ where Y and R stand for the same as above and the nitro substituent is meta or para to the HNY. group with chloroacetyl chloride or other halogenoalkyl acid halide in an inert solvent such as dry toluene at the boil, removing the solvent, for example by distillation under reduced pressure, and recrystallising the residual crude acyl derivative from a suitable solvent, for example ethyl alcohol.

The invention is illustrated, but not limited, by the following examples in which the parts are by weight.

Example 1

A mixture of 600 parts of ethyl alcohol (98%), 5 parts of 36% hydrochloric acid, 5 parts of water, and 50 parts of iron (pin dust) is boiled under reflux with stirring for two hours. To the mixture is then added 50 parts of 4-nitro-2-N-ethyl-omega-chloroacet-toluidide and boiling and stirring are continued for about 18 hours. 5 parts of anhydrous sodium carbonate are then added to the hot mixture and after stirring for about 10 minutes the iron sludge is filtered off, preferably through kieselguhr or filtercel.

20 parts of 36% hydrochloric acid are added to the filtrate and the mixture is reduced in bulk to about 100–125 parts by removal of alcohol under reduced pressure at about 40° C. The residual liquor is cooled to 0°–5° C. and the crude amine liberated by the slow addition of 40% aqueous caustic soda until the mixture is just alkaline to litmus. After stirring the cooled mixture for a short time, the precipitated amine is filtered off, washed with a little saturated sodium chloride solution and dried at ordinary temperature in air or in vacuo. The yield of crude amine is about 43 parts, M. P. 94°–98° C. Recrystallisation from 90 parts of benzene gives 35–37 parts of 4-amino-2-N-ethyl-omega-chloroacettoluidide as a creamy coloured solid of M. P. 103° C.

Example 2

A mixture of 50 parts of 4-nitro-1-N-ethyl-omega-chloroacetanilide, 50 parts of granulated tin, 600 parts of ethyl alcohol, and 200 parts of 36% hydrochloric acid is boiled under reflux for about 15 minutes until both tin and nitro compound have passed into solution. The mixture is then cooled to 5–10° C. and 53 parts of anhydrous sodium carbonate gradually added. After stirring for about 1½ hours ethyl alcohol is distilled off under reduced pressure at about 40° C. 500 parts of water are then added and the mixture made just alkaline to Brilliant Yellow paper by adding aqueous caustic soda, the temperature being kept below 5° C. The white precipitate of stannic oxide and amine is then filtered off, washed with ice cold water, and dried at ordinary temperature.

It is then extracted twice with 160 parts of boiling benzene and the benzene solutions combined and cooled, whereupon 30–33 parts of 4-amino-1-N-ethyl-omega-chloroacetanilide are obtained as a white crystalline solid having M. P. 104–106° C.

In a similar manner 4-amino-2-N-ethyl-α-bromobutyryltoluidine (M. P. 110°–112° C.) is obtained when in place of 4-nitro-1-N-ethyl-omega-chloroacetanilide used above, there is employed 4-nitro-2-N-ethyl-α-bromobutyryltoluidine.

*Example 3*

50 parts of 4-nitro-1-N-isopropyl-omega-chloroacetanilide are added to a mixture of 400 parts of methyl alcohol (98%), 70 parts of iron (pin dust) and 10 parts of 36% hydrochloric acid which has been stirred at the boil under reflux for 1½ to 2 hours.

Refluxing and stirring are continued for about 18 hours when 10 parts of anhydrous sodium carbonate are added to precipitate iron in solution. The iron residue is filtered off and the methyl alcohol distilled off from the filtrate under reduced pressure. The residue is stirred with a mixture of 300 parts of water and 19 parts of 36% hydrochloric acid, the solution filtered, cooled to 10° C. and 10.6% aqueous sodium carbonate or 8% aqueous caustic soda added slowly thereto until alkaline to litmus. The precipitate of amine so-obtained is filtered off, washed with a little water and dried at a low temperature.

32–35 parts of 4-amino-1-N-isopropyl-omega-chloroacetanilide are thus obtained as a white solid having M. P. 121–3° C. Crystallisation from benzene raises the melting point to 125–6° C.

If in place of the 4-nitro-1-N-isopropyl-omega-chloroacetanilide there is employed 4-nitro-1-N-n-butyl-omega-chloroacetanilide, 4-amino-1-N-n-butyl-omega-chloroacetanilide (M. P. 89°–90° C.) is obtained.

*Example 4*

A mixture of 270 parts of ethyl alcohol (98%), 6 parts of 36% hydrochloric acid, 10 parts of water and 170 parts of iron (pin dust) is stirred at the boil under reflux for 2 hours. 171 parts of 4-nitro-2-N-ethyl - omega - chloroacet - toluidide are then added and the boiling and stirring continued for 4 hours. The mixture is then cooled to 60° C., rendered just alkaline to Brilliant Yellow paper with aqueous ammonia (equal parts of ammonia of 0.88 s. g. and water) and filtered through filtercel. The precipitate is washed with ethyl alcohol (approx. 200 parts). To the combined filtrates, with good stirring, are added 900 parts of cold water. The resulting milky suspension of 4-amino-2-N-ethyl-omega-chloroacet-toluidide is stirred for 2 hours, the temperature being kept below 20° C., while the amine assumes a granular form. The amine is then filtered off and dried at below 40° C. It melts at 94–96° C. Recrystallisation from benzene raises the M. P. to 103° C.

*Example 5*

A mixture of 200 parts of ethyl alcohol (98%), 100 parts of iron (pin dust) and 12 parts of 36% hydrochloric acid is stirred and boiled under reflux for 2 hours. 97 parts of 4-nitro-1-N-ethyl-omega-chloroacetanilide are added and the stirring and boiling continued for 2 hours. The mixture is then cooled to 60–65° C., rendered alkaline to Brilliant Yellow paper by addition of aqueous ammonia (equal parts of ammonia of 0.88 s. g. and water), and filtered. The precipitate of iron sludge is washed with approximately 120 parts of ethyl alcohol and the combined filtrates added to a mixture of 600 parts of ice and 600 parts of water. The oily material which is at first precipitated becomes granular on stirring. It is then filtered off, washed with ice-cold water and dried at below 40° C. The crude 4 - amino - 1 - N - ethyl-omega - chloroacetanilide melts at 92–93° C. Crystallisation from benzene raises the M. P. to 104–5° C.

*Example 6*

A mixture of 304 parts of ethyl alcohol (98%), 25.65 parts of 4-nitro-1-N-ethyl-omega-chloro propionanilide, 24.3 parts of granulated tin and 111 parts of 36% hydrochloric acid is stirred and heated at the boil under reflux until all solid has dissolved. This takes about ¼ hour. The mixture is cooled to 5–10° C. and 30 parts of anhydrous sodium carbonate are gradually added. After stirring for 1½ hours ethyl alcohol is distilled off under reduced pressure at about 40° C. The residual syrup is diluted with 155 parts of water and while stirring and keeping the temperature below 10° C., 10-normal caustic soda solution is added till the mixture is alkaline to Brilliant Yellow paper. The precipitate is filtered off and washed with saturated brine solution. It is dried at room temperature and extracted four times with 50 parts of boiling benzene. On cooling the combined extracts white crystals of 4-amino-1-N-ethyl-omega-chloropropionanilide M. P. 108–110° C. are deposited. By evaporating off a portion of the benzene from the mother liquor at room temperature a further crop of crystals M. P. 106–108° C. is obtained.

If 27 parts of 4-nitro-2-N-ethyl-omega-chloropropiontoluidide are used in place of the 25.65 parts of 4-nitro-1-N-ethyl-omega-chloropropionanilide employed above, 4-amino-2-N-ethyl-omega-chloropropiontoluidide is obtained.

*Example 7*

31.5 parts of 4-nitro-2-N-ethyl-omega-bromopropiontoluidide, 24.3 parts of granulated tin, 111 parts of 36% hydrochloric acid and 288 parts of ethyl alcohol (98%) are stirred together and heated at the boil under reflux until all the tin has dissolved. The mixture is cooled below 10° C., 30 parts of anhydrous sodium carbonate are added gradually and after stirring 1½ hours ethyl alcohol is removed by distillation under reduced pressure at about 40° C. 105 parts of water are added and the stirred mixture is made alkaline to Brilliant Yellow paper by the addition of aqueous caustic soda solution, the temperature being maintained below 10° C. The precipitate is filtered off and washed with saturated brine solution. It is then dried at room temperature and extracted three times with 100 parts of boiling benzene. 4-amino-2-N-ethyl-omega-bromopropiontoluidide separates from the combined benzene extracts on cooling and is filtered off and dried at room temperature. It melts at 126–127° C.

*Example 8*

A mixture of 26 parts iron (pin dust), 55 parts of ethyl alcohol (98%) and 3 parts of 36% hydrochloric acid is stirred and boiled under reflux for 1½ hours. 27 parts of 4-nitro-1-N-ethyl-omega-chloropropionanilide are then added and stirring and boiling continued for 3 hours. The mixture is cooled to 60–65° C., rendered alkaline to Brilliant Yellow paper by the addition of aqueous ammonia (equal parts of ammonia of 0.88 s. g. and water), and filtered. The precipitate of iron sludge is washed with a little warm ethyl alcohol and the filtrates combined. The alcoholic solution is then cooled to 15° C. and poured into a stirred mixture of 160 parts of ice and 160 parts of water. The crude 4-amino-1-N-ethyl-omega-chloropropionanilide (M. P. 98°–102° C.) thereby precipitated is filtered off. It melts at 98°–102° C. It may be purified by dissolving it in dilute hydrochloric acid and treating the resulting solution of the hydrochloride with 2 parts animal charcoal at 50° C. for ¼ hour. The charcoal is then filtered off and the free amine reprecipitated by the addition of sodium carbonate at 0–5° C. After washing with a little water and drying below 30° C. the amine melts at 103–5° C. Crystallisation from benzene raises the M. P. to 106°–108° C.

We claim:

1. A primary amine of the benzene series represented by the formula

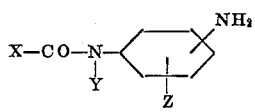

wherein X is one of a group consisting of mono- chloro- and monobromo-alkyl containing 1 to 3 carbons, Y is alkyl containing 1 to 4 carbons and Z is one of a group consisting of hydrogen and methyl.

2. 4-amino-2-N-ethyl-omega-chloroacet-toluidide.

3. 4-amino-1-N-ethyl-omega-chloroacetanilide.

4. 4-amino-1-N-ethyl-omega-chlorpropionanilide.

5. Process for the manufacture of primary amines of the benzene series by reduction of the nitro group of a compound represented by the formula

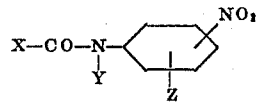

wherein X is one of a group consisting of monochloro- and monobromo-alkyl containing 1 to 3 carbons, Y is alkyl containing 1 to 4 carbons and Z is one of a group consisting of hydrogen and methyl, which comprises heating the compound in a reduction mixture containing a metal of the group consisting of iron and tin, and an alcoholic solution of hydrochloric acid and a reduced chloride of said metal.

6. The process in accordance with claim 5 in which the metal is iron and sufficient ferrous iron is present to reduce all the nitro group.

ARTHUR HOWARD KNIGHT.
WILLIAM ELLIOT STEPHEN.